(12) United States Patent
Demangone et al.

(10) Patent No.: US 6,682,230 B1
(45) Date of Patent: Jan. 27, 2004

(54) OPTICAL CONNECTOR AND PRINTED CIRCUIT BOARD ASSEMBLY WITH MOVABLE CONNECTION

(75) Inventors: Drew A. Demangone, Latrobe, PA (US); Hung Viet Ngo, Harrisburg, PA (US)

(73) Assignee: Berg Technology, Inc., Reno, NV (US)

( * ) Notice: Subject to any disclaimer, the term of this patent is extended or adjusted under 35 U.S.C. 154(b) by 212 days.

(21) Appl. No.: 09/634,409

(22) Filed: Aug. 9, 2000

(51) Int. Cl.$^7$ .............................. G02B 6/42; G02B 6/36
(52) U.S. Cl. ............................................ 385/88; 385/60
(58) Field of Search ..................... 385/88–90, 92, 385/55, 58–60, 70–72, 77, 78

(56) References Cited

U.S. PATENT DOCUMENTS

| | | |
|---|---|---|
| 3,879,102 A | 4/1975 | Horak |
| 4,361,372 A | 11/1982 | Majkrzak et al. |
| 4,432,604 A | 2/1984 | Schwab |
| 4,526,431 A | 7/1985 | Kasukawa |
| 4,547,039 A * | 10/1985 | Caron et al. |
| 4,725,120 A * | 2/1988 | Parzygnat |
| 4,798,440 A * | 1/1989 | Hoffer et al. |
| 5,044,977 A | 9/1991 | Vindigni ..................... 439/374 |
| 5,080,461 A | 1/1992 | Pimpinella ................... 385/65 |
| 5,134,679 A * | 7/1992 | Robin et al. .................. 385/90 |
| 5,263,878 A | 11/1993 | Lai .............................. 439/656 |
| 5,542,015 A * | 7/1996 | Hultermans ................... 385/60 |
| 5,681,187 A | 10/1997 | Fukushima et al. .......... 439/700 |
| 5,749,754 A | 5/1998 | Patterson et al. ............. 439/824 |
| 5,828,805 A | 10/1998 | Morlion et al. ................ 385/59 |
| 5,883,998 A | 3/1999 | Stevens et al. ............. 385/134 |
| 5,899,753 A | 5/1999 | Wong et al. ................... 439/17 |
| 5,930,425 A | 7/1999 | Abel et al. ..................... 385/53 |
| 5,931,688 A | 8/1999 | Hasz et al. .................. 439/247 |
| 5,980,312 A | 11/1999 | Chapman et al. ......... 439/540.1 |
| 6,116,790 A * | 9/2000 | Vergeest ....................... 385/60 |

FOREIGN PATENT DOCUMENTS

| | | |
|---|---|---|
| DE | 19539549 C1 | 12/1996 |
| EP | 0485196 A2 | 5/1992 |
| EP | 0807997 A1 | 11/1997 |
| EP | 1006378 A1 | 6/2000 |

OTHER PUBLICATIONS

European Search Report dated Nov. 27, 2001.

* cited by examiner

*Primary Examiner*—Akm Enayet Ullah
*Assistant Examiner*—Mike Stahl
(74) *Attorney, Agent, or Firm*—Harrington & Smith, LLP

(57) ABSTRACT

An optical connector assembly comprising a base, an optical fiber connector, and a spring. The base is adapted to be fixedly attached to a printed circuit board. The optical fiber connector has an outer housing movably mounted to the base. The spring biases the optical fiber connector in a predetermined direction relative to the base.

41 Claims, 5 Drawing Sheets

OPTICAL CONNECTOR AND PRINTED CIRCUIT BOARD ASSEMBLY WITH MOVABLE CONNECTION

BACKGROUND OF THE INVENTION

1. Field of the Invention

The present invention relates to optical connectors and, more particularly, to a movable connection of an optical connector to a printed circuit board.

2. Brief Description Of Prior Developments

U.S. Pat. No. 4,432,604 discloses a self-adjusting fiberoptic connector assembly having optical fiber plugs connected to a backplane by movable brackets. U.S. Pat. No. 5,828,805 discloses a multifiber optical connector plug. U.S. Pat. No. 4,361,372 discloses a connector panel for an electronic cabinet having spring-loaded cells for a floating plate on a connector panel.

Problems exist with conventional optical fiber connector adapters in that they do not necessarily provide adequate connector float in an axis of connector insertion (z-axis float). There is a need for an optical fiber connection system for a backplane environment which has more float and "z" direction tolerance. Conventional optical fiber connectors mounted to a daughter printed circuit board are not easily removable from the daughter board. There is a desire to provide a connection system for providing a more easily removable connection of an optical fiber connected to a daughter board. Conventional optical fiber connector and daughter printed circuit board assemblies sometimes have a relatively large extraction force requirement in order to disconnect the assembly from a backplane member. There is a desire to reduce the extraction force or at least make the disconnection of the assembly from the backplane member easier.

SUMMARY OF THE INVENTION

In accordance with one embodiment of the present invention, an optical connector assembly is provided comprising a base, an optical fiber connector, and a spring. The base is adapted to be fixedly attached to a printed circuit board. The optical fiber connector has an outer housing movably mounted to the base. The spring biases the optical fiber connector in a predetermined direction relative to the base.

In accordance with another embodiment of the present invention, an electronic and optical assembly is provided comprising a printed circuit board; and an optical fiber connector mounted on the printed circuit board. A portion of the optical connector extends beyond an edge of the printed circuit board. The optical connector is movably mounted to move inward and outward relative to the edge.

In accordance with another embodiment of the present invention, an optical connector assembly is provided comprising: a ferrule and optical fiber subassembly, an outer housing, a base, and a spring. The outer housing surrounds the subassembly. The subassembly is movable in a longitudinal direction in the outer housing. The base is connected to the outer housing. The outer housing is movable relative to the base. The base is adapted to be fixedly attached to a printed circuit board. The spring biases the outer housing in a predetermined direction relative to the base.

In accordance with one method of the present invention, a method of assembling an optical connector assembly comprising steps of providing an optical connector comprising an outer housing and a ferrule and optical fiber assembly located inside the housing; providing a base adapted to be fixedly attached to a printed circuit board; and movably mounting the optical connector to the base and biasing the outer housing of the optical connector in a predetermined direction relative to the base.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
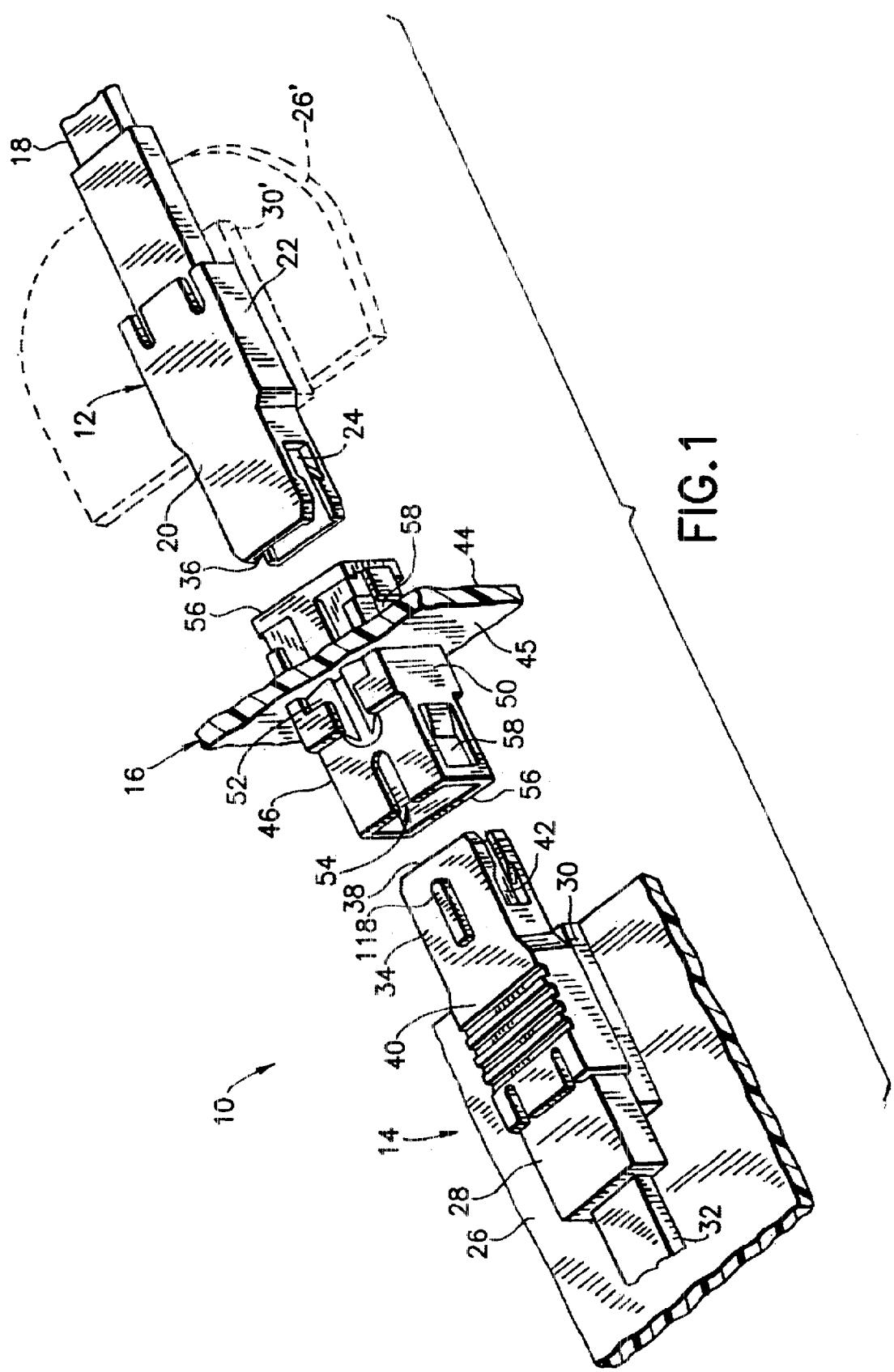
FIG. 1 is an exploded perspective view of a backplane connection system having a combined optical fiber connector and daughter printed circuit board assembly incorporating features of the present invention.

Referring to FIG. 1, there is shown a partial exploded perspective view of a backplane connection system 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The backplane connection system 10 generally comprises a first optical cable assembly 12, a combined printed circuit board and optical cable assembly 14, and a backplane assembly 16. The first optical cable assembly 12 generally comprises an optical fiber cable 18 preferably having multiple optical fibers and an optical connector 20. The connector 20 could be any suitable optical connector, such as described in U.S. Pat. No. 5,828,805 which is hereby incorporated by reference in its entirety. Ferrules of the connector 20 precisely locate ends of the optical fibers in the connector 20 at a front end of the ferrules. The connector 20 includes an outer housing 22. The outer housing 22 includes enlarged recesses 24 on its sides for connection with the backplane assembly 16. However, in alternate embodiments the connector 20 could have any suitable configuration or features.

The combined printed circuit board and optical cable assembly 14 generally comprises a daughter printed circuit board 26, a second optical cable assembly 28 and a connecting assembly 30. The second optical cable assembly 28 generally comprises an optical fiber cable 32 and an optical connector 34. The optical fiber cable 32 preferably comprises multiple optical fibers. The optical connector 34 is similar to the connector described in U.S. pat. No. 5,828,805. Ferrules of the connector 34 precisely locate ends of the optical fibers at front ends of the ferrules. Pins (not shown), extending out the front end of a ferrule of one of the connectors 20 or 34, are matingly received in holes of a ferrule in the mating connector when the front ends 36, 38 of the connectors 20, 34 are mated to each other. The connector 34 includes an outer housing 40. The outer housing 40 includes enlarged recesses 42 on its sides for connection with the backplane assembly 16.

The backplane assembly 16 generally comprises a backplane member 44 and an optical connector adapter 46. In this embodiment the backplane member 44 is a mother printed circuit board or multi-layer board. The mother printed circuit board 44 preferably comprises at least one card edge connector (not shown) or other type of electrical connector on a front side 45 for making electrical connection with contacts (not shown) on daughter printed circuit boards; including a connector for the daughter board 26. The adapter 46 is fixedly connected to the mother board 44 in a hole between front and rear sides of the mother board. The adapter 46 generally comprises a housing 50 and a mounting clip 52. The adapter housing 50 preferably is a molded plastic member. Typically, the housing 50 is made from two pieces bonded together before mounting on the board 44. The adapter housing 50 includes an open center channel 54 and opposite open ends 56 into the channel 54. The adapter housing 50 also includes resilient latch arms 58 on sides of the adapter housing. The latch arms 58 are adapted to interact with the enlarged recesses 24, 42 in the connector outer housings 22, 40 to independently mount the connectors 20, 34 to the adapter housing 50. An adapter assembly similar to the adapter housing 50 is available from FCI Electronics of Etters, PA, USA as part number 86144.

The adapter 46 generally functions as a support for connecting the two optical connectors 20, 34 to each other at a predetermined location; one of the connectors 34 being located on a daughter printed circuit board. The optical connectors 20, 34 can have any suitable type of configuration. In alternate embodiments, features of the present invention could be used with any suitable backplane member, or optical connector adapter, or in any suitable system for connecting two optical connectors to each other.

Figure 2:
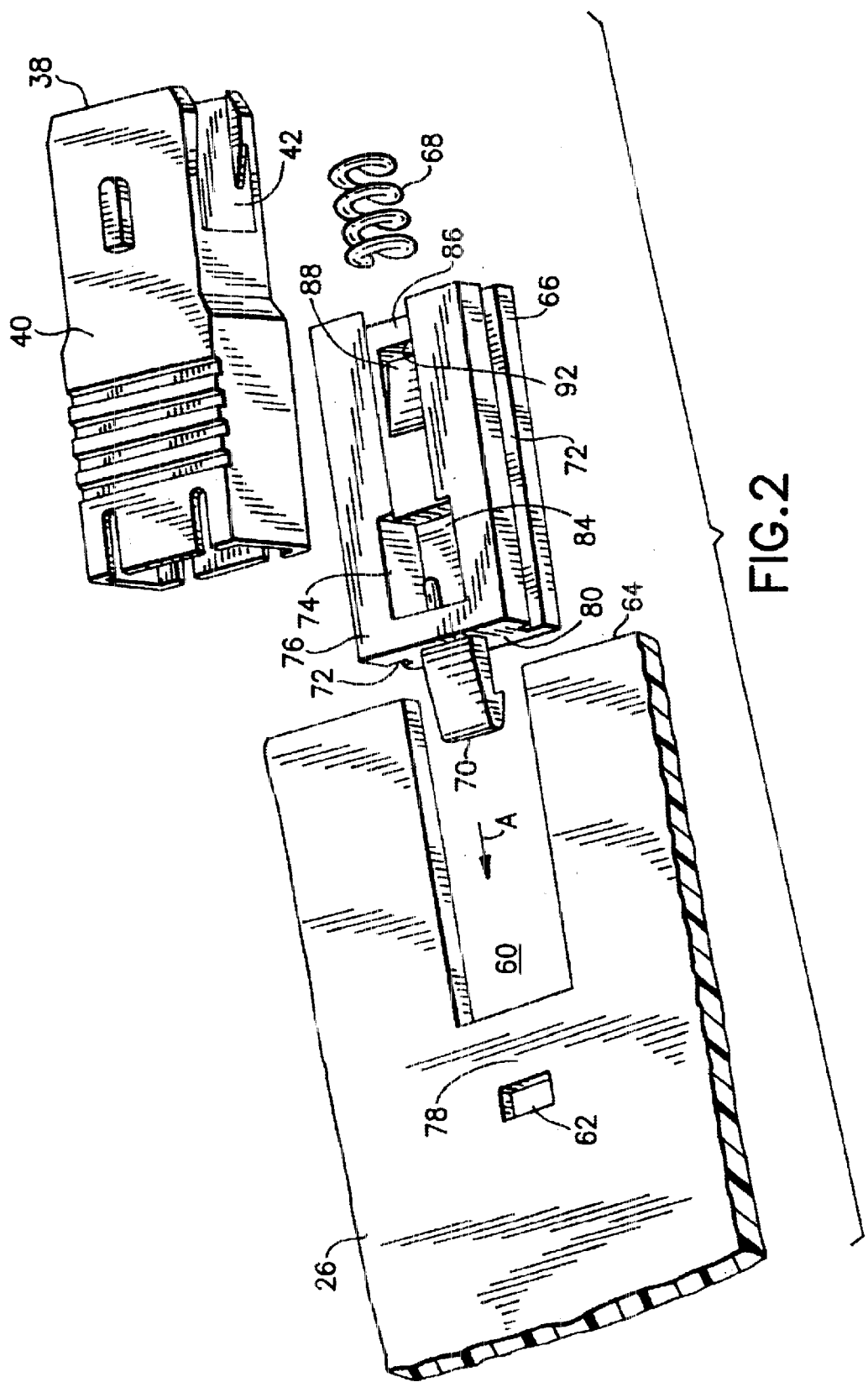
FIG. 2 is an exploded perspective view of the combined assembly shown in FIG. 1.
Figure 3:
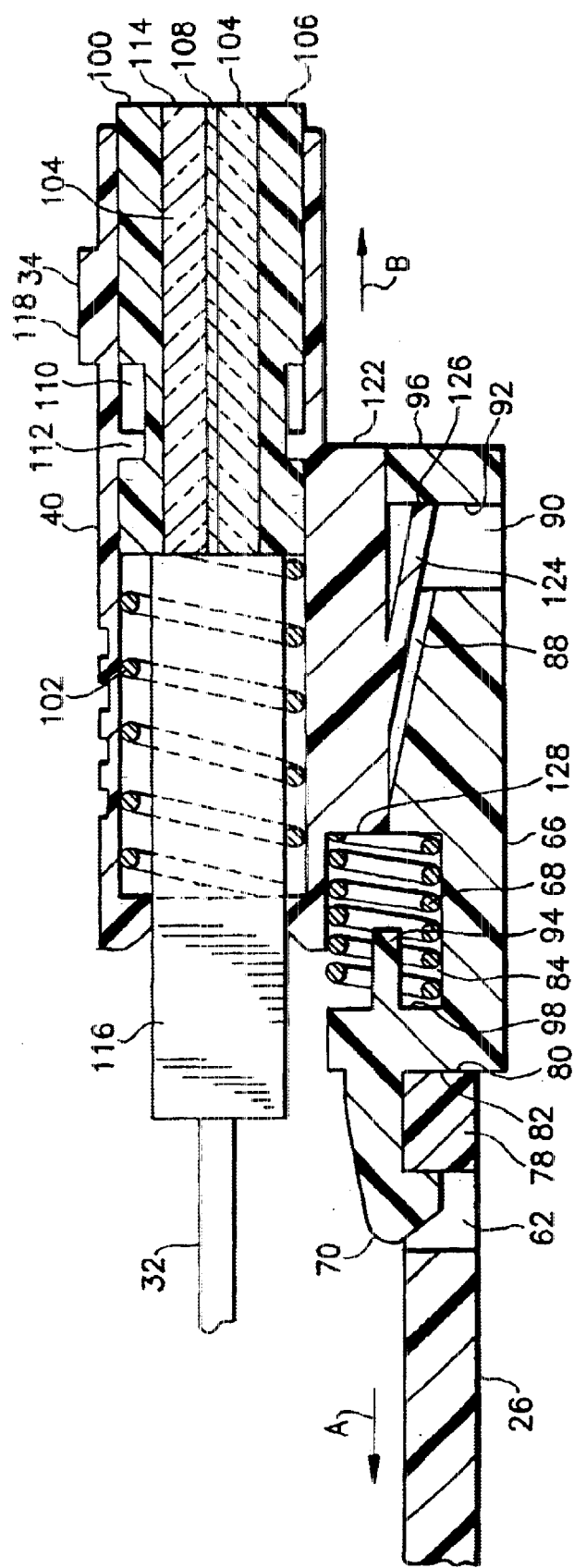
FIG. 3 is a schematic cross-sectional view of the combined assembly shown in FIG. 1.
Figure 4:
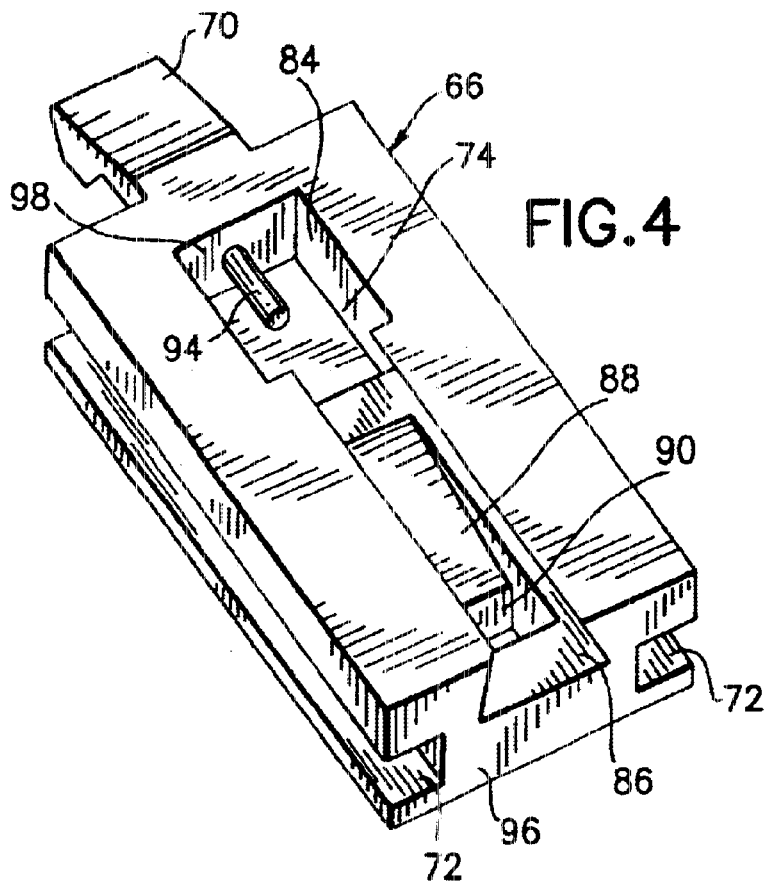
FIG. 4 is a top, front and left side perspective view of the base used in the assembly shown in FIG. 3.

Referring also to FIG. 2, the daughter board 26 preferably comprises two mounting holes 60, 62 proximate an edge 64. In this embodiment the first hole 60 is open at the edge 64. However, in alternate embodiments the hole 60 need not be open at the edge, or the daughter board could have more or less than two mounting holes. Preferably, somewhere along or proximate the edge 64 the daughter board 26 comprises contacts or contact pads (not shown) for connection to an electrical connector on the front face 45 of the mother board 44. The connecting assembly 30 generally comprises a base 66 and a spring 68. The base 66 is a one-piece member preferably comprised of a molded plastic or polymer material. However, the base could be comprised of multiple members and any suitable type(s) of material could be used. Referring also to FIGS. 3 and 4, the base 66 generally comprises a latch 70, two side slots 72 and a recess 74 in a top surface 76. The latch 70 is a cantilevered snap-lock latch adapted to snap over the portion 78 of the daughter board 26 into the second hole 62. Surface 80 of the base 66 can rest against the surface 82 in the first hole 60. The two side slots 72 slidingly receive portions of the daughter board 26 on sides of the first hole 60. The base 66 is slid into the first hole 60 as indicated by arrow A. The recess 74 generally comprises a spring locating area 84, a dovetail groove 86, and ramp and hole areas 88, 90 that form a stop surface 92. The base 66 has a spring support rod 94 extending into the spring locating area 84. The dovetail groove 86 extends to the spring locating area 84 from the end 96 of the base 66. In alternate embodiments, the base 66 could have any suitable shape or configuration. The areas 84, 86, 88, 90 and/or stop surface 92 could also have any suitable shape or configuration.

The spring 68 is located in the spring locating area 84. In this embodiment the spring 68 is a coil spring. However, in alternate embodiments any suitable type of spring could be used. The spring could also be formed integrally with the base 66 and/or outer housing 40, or could be mounted to the outer housing 40 rather than the base 66. One end of the spring rests against the surface 98 in the spring locating area 84 and the other end of the spring rests against a portion of the outer housing 40 of the connector 34.

As seen in FIG. 3, the connector 34 generally comprises the outer housing 40, a subassembly 100 and a spring 102. Spring 102 allows fine adjustment of the fibers with the fibers in a mating connector, for example, to absorb tolerance differences within the connectors. The subassembly 100 generally comprises two ferrule members 104, and inner housing 106, and ends 108 of the optical fibers from the cable 32. The ends 108 are sandwiched between the two ferrule members 104. The inner housing 106 retains the two ferrule members together. The inner housing 106 includes grooves 110. Portions 112 of the outer housing 40 extend into the grooves 110. The subassembly 100 can longitudinally slide in the outer housing 40. The interaction between the portions 112 and the grooves 110 function as limits to forward and rearward motion of the subassembly 100 in the outer housing 40. The spring 102 biases the subassembly 100 in a forward direction. Spring 102 allows for rough or coarse adjustment of the connector in order to absorb tolerance differences in the boards 26, 26'. However, the spring 102 can be compressed as the front end 114 of the subassembly 100 is pushed into the front end of the outer housing 40 when the front end 114 makes contact with the front end of the mating connector 20. The spring 102 can thus allow for specific ferrule compression or mating force which is desired in a backplane fiber optic connector. In a preferred embodiment the connector 34 allows for a ±2 mm longitudinal mismatch when the connectors 20, 34 are connected to the adapter 46. A boot 116 is provided as a strain relief for the cable 32. However, in an alternate embodiment any suitable optical fiber and ferrule subassembly could be provided and any suitable system for movably mounting the subassembly to the outer housing could be provided. In another alternate embodiment the subassembly could be stationarily connected to the outer housing.

Figure 5:
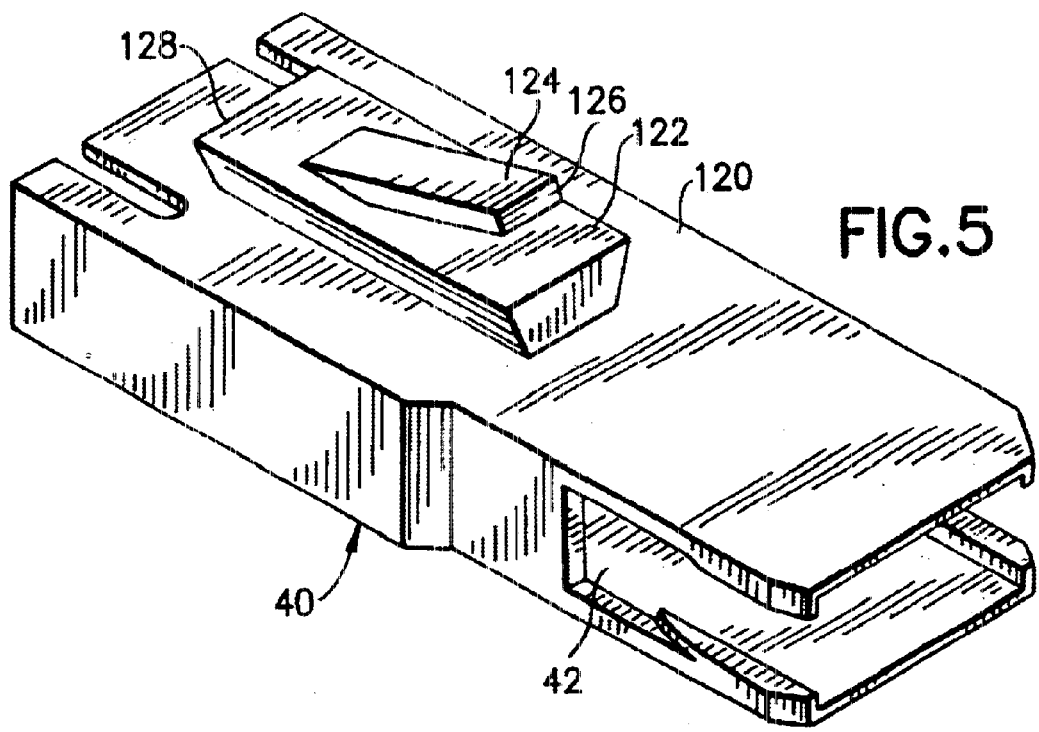
FIG. 5 is a bottom, front and right side perspective view of the outer housing of the optical fiber connector shown in FIG. 3.

Referring also to FIG. 5, the outer housing 40 is preferably a one-piece member comprised of molded plastic or polymer material. The outer housing 40 comprises a top side with a guide stop 118 (see FIGS. 1 and 3) and a bottom side 120. The bottom side 120 includes a guide rail section 122 and a resiliently deflectable stop latch 124. The guide rail section 122 has a cross-sectionally complimentary shape to the cross-sectional shape of the groove 86 in the base. In this embodiment the guide rail section 122 has a dovetail cross-sectional shape. However, any suitable, slidably interlocking shapes could be provided for the groove 86 and guide rail section 122. The latch 124 extends downward from the guide rail section 122. An end 126 of the latch 124 is adapted to contact the stop surface 92 of the base 66 to limit movement of the outer housing 40 on the base 66 in direction B (see FIG. 3). The guide rail section 122 is slid into the groove 86 from rear end 96 of the base 66. The latch 124 is deflected upward and then snaps back downward behind the stop surface 92. The rear end 128 of the guide rail section 122 forms a spring contact surface for contacting an end of the spring 68 in the base 66. The spring 68 biases the outer housing 40 in direction B on the base 66 with the latch 124 locating the outer housing at a predetermined position on the base. The outer housing 40 can be moved in direction A relative to the base 66 with the spring 68 being compressed between the surfaces 128 and 98. In alternate embodiments any suitable type of movable interconnection between the optical connector and the base could be provided.

With the present invention, not only is the subassebmly 100 movably mounted to the outer housing 40, but the outer housing 40 is movably mounted to the daughter board 26. This provides a dual type of Z axis float. The first type of Z axis float can compensate for the connections between the connectors 20, 34 and the adapter 46 while still providing a desired predetermined compression mating force between the front ends of the ferrules of the two connectors. The second type of Z axis float can compensate for Z axis differentials between the connector 34 and the adapter 46, and electrical connection(s) between the daughter board 26 and the mother board 44. An alternative solution would be to merely lengthen the spring 102 and keep the outer housing stationarily connected to the daughter board. However, this might not provide the correct mating force at the ends of the ferrules; very little mating force at −2 mm, and too much mating force at +2 mm. The spring assembly can also provide float in the X- and Y-axes.

When the connector 34 is inserted into the adapter 46 and is fully inserted, the outer housing 40 will stop against the adapter housing 50. However, the daughter board 26 can continue to move in the Z direction to compensate for tolerances in the backplane assembly. The connector 34 will be at the correct depth of insertion in the adapter 46 without exposing the ferrule subassembly 100 to any of the forces associated with daughter board/mother board connection tolerances. The present invention allows for daughter board card edge connections at both front and rear sides of the backplane assembly, such as shown by dotted lines in FIG. 1 with board 26' and connecting assembly 30'. The present invention allows use of standard conventional springs as the springs 102 in the optical connector 34 so the correct ferrule mating force will be achieved. The present invention allows backplane assemblies to be built with greater tolerances; thereby reducing manufacturing costs. The present invention can also allow easier removal of the assembly 14 from the backplane assembly 16 by allowing the card 26 to start to move away from the mother board 44 before disconnection forces are encountered between the connector outer housing 40 and the adapter housing 50. It is also relatively easy to disconnect the connector 34 from the base 66 by merely inserting a tool (not shown) in the bottom of the hole 90 to deflect the latch 124 upward past the stop surface 92 and then merely sliding the connector 34 in direction B off of the base 66, such as for repair or replacement of the optical cable assembly 28.

Figure 6:
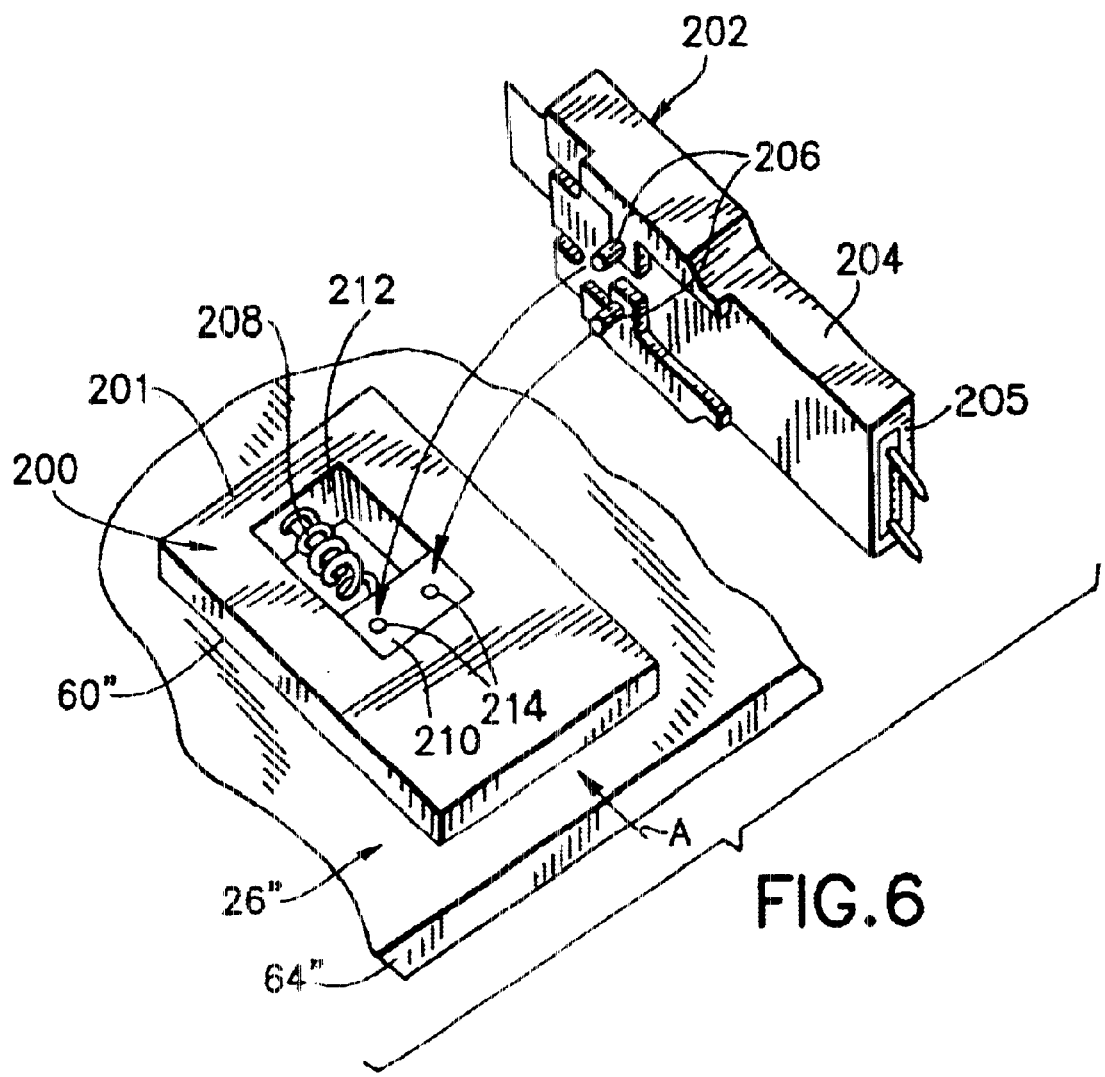
FIG. 6 is a partially exploded perspective view of an alternate embodiment of the present invention.

Referring now to FIG. 6, an alternate embodiment of the present invention is shown. The system generally comprises a daughter board 26", a connecting assembly 200, and a conventional optical cable assembly 202. In this embodiment the daughter board 26" has a hole 60" which receives the base 201. In this embodiment the hole 60" is spaced from the edge 64", but the card 26" could have the same holes 60, 62 as shown in FIG. 2, such as if the base 201 had attachment means 70, 72. Any suitable means could be used to attach the base 201 to the daughter board 26". The optical cable assembly 202 generally corresponds to a conventional optical cable assembly, such as having an adapter assembly available from FCI Electronics of Etters, Pa. as part number 86144. The outer housing 204 of the assembly 202 includes two mounting posts 206. The mounting posts 206 were originally designed for through-hole mounting of the posts in holes of a daughter board. The embodiment shown in FIG. 6 makes use of the mounting posts 206 to attach the assembly 202 to the connecting assembly 200. Thus, the connecting assembly 200 has been designed to not require redesign of the conventional optical cable assembly 202. The present invention allows use of the conventional optical cable assembly 202 with either a conventional fixed mounting to a daughter board or with a movable mounting to a daughter board via a connecting assembly 200. The connecting assembly 200 could be modified to allow connection of any suitable type of conventional optical cable assembly thereto to provide the same type of possible dual use of such other conventional optical cable assemblies.

The connecting assembly 200 generally comprises the base 201, a spring 208, and a movable slide 210. The base 201 includes a recess 212 in a top side. The movable slide 210 is movably mounted in the recess 212. The slide 210 is shown in a forward position in FIG. 6. The spring 208 is also located in the recess 212 and biases the slide 210 at its forward position. Any suitable means can retain the spring 208 and the slide 210 in the recess 212. The slide includes two mounting holes 214 on its top side. The holes 214 are suitably sized, shaped and located relative to each other to have the mounting posts 206 of the optical cable assembly 202 inserted into the holes 214 and thereby fixedly mount the outer housing 204 to the slide 210. The connection ability of the slide 210 could be configured to allow connection of any suitable conventional optical connector housing. With the outer housing 204 connected to the slide 210, the optical connector assembly 202 is mounted to the daughter board 26" with its front end 205 extending past the edge 64", but the connector assembly 202 can move in direction A if necessary, with the spring 208 being compressed, during mating of the daughter card 26" and connector assembly 202 to another electrical/optical assembly, such as in a backplane.

Figure 6A:
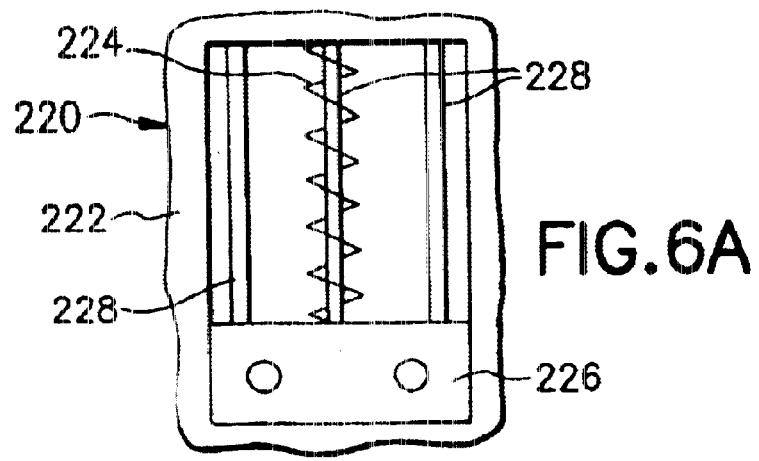
FIG. 6A is a partial top plan view of an alternate embodiment of the embodiment shown in FIG. 6.

Referring also to FIG. 6A a partial top plan view of an alternate embodiment of the connecting assembly of FIG. 6 is shown. In this embodiment the connecting assembly 220 includes a base 222, a spring 224, and a slide 226. The base 222 includes rails or guide pins 228. The slide 226 is slidably mounted on the rails. The spring 224 is a coil spring located around the center rail. The center rail keeps the spring 224 attached to the base 222. The rails 228 also keep the slide 226 attached to the base 222. However, any suitable slide mounting configuration or slide biasing configuration could be used.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical connector assembly comprising:

a base adapted to be fixedly attached to a printed circuit board;

an optical fiber connector having an outer housing movably mounted to the base; and a spring biasing the optical fiber connector in a predetermined direction relative to the base, wherein the outer housing is slidably mounted on an exterior side of the base.

2. An optical connector assembly as in claim 1 wherein the base comprises a latch adapted to project into a hole of the printed circuit board to latch the base to the printed circuit board.

3. An optical connector assembly comprising:

a base adapted to be fixedly attached to a printed circuit board;

an optical fiber connector having an outer housing movably mounted to the base; and a spring biasing the optical fiber connector in a predetermined direction relative to the base, wherein the base comprises two side slots for receiving portions of the printed circuit board.

4. An optical connector assembly as in claim 1 wherein the base comprises a recess, wherein the spring is located in the recess and a portion of the outer housing is located in the recess against a portion of the spring.

5. An optical connector assembly as in claim 4 wherein the base comprises a stop surface and the outer housing comprises a stop projection for contacting each other and limiting movement of the outer housing relative to the base in the predetermined direction.

6. An optical connector assembly as in claim 1 wherein the optical fiber connector comprises a ferrule and optical fiber subassembly biased by a connector spring relative to the outer housing in the first direction.

7. An optical connector assembly comprising:

a base adapted to be fixedly attached to a printed circuit board;

an optical fiber connector having an outer housing movably mounted to the base; and a spring biasing the optical fiber connector in a predetermined direction relative to the base, wherein the outer housing comprises a bottom guide rail section slidingly mounted in a recess of the base, and wherein the outer housing further comprises a bottom deflectable stop latch.

8. An optical connector assembly as in claim 7 wherein the guide rail and recess comprise a mating interlocking cross-sectional shape.

9. An optical connector assembly as in claim 8 wherein the mating interlocking cross-sectional shape comprises a dove-tail cross-sectional shape.

10. An optical connector assembly as in claim 1 wherein the spring comprises a coil spring.

11. An electronic and optical assembly comprising:

a printed circuit board; and an optical fiber connector mounted on the printed circuit board, wherein a portion of the optical connector extends beyond an edge of the printed circuit board, wherein the optical connector is movably mounted to move inward and outward relative to the edge, wherein the assembly comprises a base stationarily connected to the printed circuit board, and wherein the optical fiber connector comprises an outer housing movably mounted on an exterior side of the base.

12. An assembly as in claim 11 wherein the assembly comprises a spring located between the base and the housing which biases the housing outward relative to the edge.

13. An optical connector assembly comprising:

a ferrule and optical fiber subassembly, the subassembly comprising an inner housing, at least one ferrule member connected to the inner housing and at least one optical fiber connected to the ferrule member;

an outer housing surrounding the subassembly, the subassembly being movable in a longitudinal direction in the outer housing;

a first spring biasing the subassembly in a first predetermined direction relative to the outer housing;

a base connected to the outer housing, the outer housing being movable relative to the base, the base being adapted to be fixedly attached to a printed circuit board; and a second spring biasing the outer housing in a second predetermined direction relative to the base.

14. An optical connector assembly as in claim 13 wherein the base comprises a latch adapted to project into a hole of the printed circuit board to latch the base to the printed circuit board.

15. An optical connector assembly comprising:

a ferrule and optical fiber subassembly;

an outer housing surrounding the subassembly, the subassembly being movable in a longitudinal direction in the outer housing;

a base connected to the outer housing, the outer housing being movable relative to the base, the base being adapted to be fixedly attached to a printed circuit board; and a spring biasing the outer housing in a predetermined direction relative to the base, wherein the base comprises two side slots for receiving portions of the printed circuit board.

16. An optical connector assembly as in claim 13 wherein the base comprises a recess, and wherein the second spring is located in the recess and a portion of the outer housing is located in the recess against a portion of the second spring.

17. An optical connector assembly as in claim 16 wherein the base comprises a stop surface and the outer housing comprises a stop projection for contacting each other and limiting movement of the outer housing relative to the base in the predetermined direction.

18. An optical connector assembly comprising:

a ferrule and optical fiber subassembly;

an outer housing surrounding the subassembly, the subassembly being movable in a longitudinal direction in the outer housing;

a base connected to the outer housing, the outer housing being movable relative to the base, the base being adapted to be fixedly attached to a printed circuit board; and a spring biasing the outer housing in a predetermined direction relative to the base, wherein the outer housing comprises a bottom guide rail section slidingly mounted in a recess of the base.

19. An optical connector assembly as in claim 18 wherein the guide rail and recess comprise a mating interlocking cross-sectional shape.

20. An optical connector assembly as in claim 19 wherein the mating interlocking cross-sectional shape comprises a dove-tail cross-sectional shape.

21. An optical connector assembly as in claim 18 wherein the outer housing further comprises a bottom deflectable stop latch.

22. An optical connector assembly as in claim 13 wherein the second spring comprises a coil spring.

23. A method of assembling an optical connector assembly comprising steps of:
   providing an optical connector comprising an outer housing and a ferrule and optical fiber assembly located inside the housing;
   providing a base adapted to be fixedly attached to a printed circuit board; and
   movably mounting the optical connector to the base and biasing the outer housing of the optical connector in a predetermined direction relative to the base, wherein the step of providing the optical connector comprises providing an inner housing fixedly connected to the ferrule and optical fiber assembly, the inner housing being movably mounted in the outer housing, and providing a spring between the inner and outer housings to bias the inner housing at a predetermined position in the outer housing.

24. An optical connector assembly as in claim 1 wherein the spring is compressed between a portion of the base and a portion of the outer housing of the optical fiber connector.

25. An optical connector assembly as in claim 1 wherein the optical fiber connector further comprises a ferrule and optical fiber subassembly movably mounted to the outer housing and a connector spring biasing the subassembly at a predetermined position relative to the outer housing.

26. An optical connector assembly as in claim 25 wherein the optical fiber connector further comprises an inner housing movably mounted to the outer housing and having the subassembly connected thereto, the connector spring being compressed between portions of the inner and outer housings.

27. An optical connector assembly as in claim 1 wherein the base comprises a deflectable latch for snap-lock latching the base to the printed circuit board.

28. An optical connector assembly comprising:
   a base adapted to be fixedly attached to a printed circuit board;
   an optical fiber connector having an outer housing movably mounted to the base; and
   a spring biasing the optical fiber connector in a predetermined direction relative to the base,
   wherein the outer housing comprises a resiliently deflectably cantilevered latch extending from an exterior side which is received in an area of the base such that the latch can move in the area without being moved by the base.

29. An optical connector assembly as in claim 1 wherein the outer housing is movably between a first position and a second position relative to the base, and wherein the spring is compressed when the outer housing is moved from the first position to the second position.

30. An electronic and optical assembly as in claim 11 wherein the portion of the optical connector which extends beyond the edge of the printed circuit board comprises a mating end of a ferrule and optical fiber subassembly extending outward past the edge of the printed circuit board.

31. An electronic and optical assembly as in claim 11 wherein the optical fiber connector comprises a ferrule and optical fiber subassembly, an inner housing fixedly connected to the ferrule and optical fiber subassembly, and a connector spring biasing the subassembly and the inner housing at a predetermined position in the outer housing.

32. An electronic and optical assembly as in claim 11 wherein the outer housing comprises a resiliently deflectably cantilevered latch extending from an exterior side which is received in an area of the base such that the latch can move in the area without being moved by the base.

33. An electronic and optical assembly as in claim 11 wherein the base comprises a deflectable latch for snap-lock latching the base to the printed circuit board.

34. An electronic and optical assembly as in claim 31 wherein the subassembly is movably mounted in the outer housing along a first longitudinal axis, and wherein the outer housing is movably mounted to the base along a second, offset longitudinal axis.

35. An optical connector assembly as in claim 13 wherein the outer housing is located against an exterior side of the base.

36. An optical connector assembly as in claim 13 wherein the subassembly is movably mounted in the outer housing along a first longitudinal axis, and wherein the outer housing is movably mounted to the base along a second, offset longitudinal axis.

37. An optical connector assembly as in claim 13 wherein the outer housing is movable on the base between a first position and a second position, and wherein the second spring is compressed between portions of the outer housing and the base when the outer housing is moved from the first position to the second position.

38. An optical connector assembly as in claim 13 wherein the ferrule and optical fiber subassembly comprises a mating connector end which extends in an outward direction away from the base.

39. A method as in claim 23 wherein the step of movably mounting the optical connector to the base comprises the optical connector being movable between a first position and a second position on the base, and wherein the predetermined direction comprises the optical connector being biased in an outward direction relative to the base.

40. A method as in claim 23 wherein the step of movably mounting the optical connector to the base comprises snap-lock mounting the outer housing to the base, and wherein the outer housing is movable between at least two positions of the base after the outer housing is snap-lock mounted to the base.

41. An optical connector assembly comprising:
   a base adapted to be fixedly attached to a printed circuit board;
   an optical fiber connector outer housing movably mounted to the base;
   an optical fiber connector subassembly having an end of at least one optical cable, the subassembly being movably mounted to the outer housing;
   a first spring biasing the subassembly in a predetermined direction relative to the outer housing; and
   a second spring biasing the outer housing in a predetermined direction relative to the base.

* * * * *